(12) United States Patent
Lutz et al.

(10) Patent No.: US 10,717,096 B2
(45) Date of Patent: Jul. 21, 2020

(54) POWDER CONVEYOR FOR CONVEYING COATING POWDER TO A POWDER APPLICATOR, POWDER COATING SYSTEM, AND METHOD FOR OPERATING THE POWDER CONVEYOR

(71) Applicant: Wagner International AG, Altstatten (CH)

(72) Inventors: Gilbert Lutz, Kriessern (CH); Patrik Studerus, Steinach (CH)

(73) Assignee: Wagner International AG, Alstatten (CH)

( * ) Notice: Subject to any disclaimer, the term of this patent is extended or adjusted under 35 U.S.C. 154(b) by 0 days.

(21) Appl. No.: 16/097,242

(22) PCT Filed: Mar. 22, 2017

(86) PCT No.: PCT/EP2017/025055
§ 371 (c)(1),
(2) Date: Oct. 27, 2018

(87) PCT Pub. No.: WO2017/186355
PCT Pub. Date: Nov. 2, 2017

(65) Prior Publication Data
US 2019/0111445 A1    Apr. 18, 2019

(30) Foreign Application Priority Data
Apr. 29, 2016    (EP) .................... 16167644

(51) Int. Cl.
*B05B 7/14*    (2006.01)
*F16K 7/07*    (2006.01)
(Continued)

(52) U.S. Cl.
CPC ......... *B05B 7/1459* (2013.01); *B05B 7/1454* (2013.01); *B05B 7/1463* (2013.01);
(Continued)

(58) Field of Classification Search
CPC ... B05B 7/1459; B05B 7/1463; B05B 7/1454; B05B 12/02; B05B 12/006; B05B 12/085; B05B 14/40; B05B 15/40; F16K 7/07
See application file for complete search history.

(56) References Cited

U.S. PATENT DOCUMENTS

| | | | |
|---|---|---|---|
| 4,900,199 A * | 2/1990 | Spaulding | B05B 7/1445 406/121 |
| 5,615,832 A | 4/1997 | Price | |
| 6,287,056 B1 * | 9/2001 | Szikszay | B65G 53/12 406/127 |

FOREIGN PATENT DOCUMENTS

| | | |
|---|---|---|
| EP | 1 454 675 A2 | 9/2004 |
| EP | 1 772 195 A2 | 4/2007 |

OTHER PUBLICATIONS

International Search Report for corresponding App. No. PCT/EP2017/025055, dated May 24, 2017.

* cited by examiner

*Primary Examiner* — William R Harp
(74) *Attorney, Agent, or Firm* — Renner, Otto, Boisselle and Sklar, LLP (57) ABSTRACT

A powder conveying device for the conveying of coating powder to a powder applicator includes a working container that is designed and operable appropriately such that it can be pressurized. The working container further includes a powder inlet and a powder outlet, whereby the powder outlet is connected to a powder outlet valve. In addition, a powder conduit is provided that is connected, on the inlet side, to the powder outlet valve and includes, on the inlet side, an inlet for transport air. The powder conduit can be connected, on the outlet side, to a powder applicator. Moreover, a control is provided that is designed and operable appropriately such (Continued)

that it controls the amount of powder to be conveyed by repeatedly opening and closing the powder outlet valve.

16 Claims, 5 Drawing Sheets

(51) Int. Cl.
*B05B 12/08* (2006.01)
*B05B 14/40* (2018.01)
*B05B 12/00* (2018.01)
*B05B 12/02* (2006.01)
*B05B 15/40* (2018.01)

(52) U.S. Cl.
CPC ............ *B05B 12/006* (2013.01); *B05B 12/02* (2013.01); *B05B 12/085* (2013.01); *B05B 14/40* (2018.02); *F16K 7/07* (2013.01); *B05B 15/40* (2018.02)

POWDER CONVEYOR FOR CONVEYING COATING POWDER TO A POWDER APPLICATOR, POWDER COATING SYSTEM, AND METHOD FOR OPERATING THE POWDER CONVEYOR

Powder conveyor for conveying coating powder to a powder applicator, powder coating system, and method for operating the powder conveyor

TECHNICAL FIELD

The invention relates to a powder conveyor for conveying of coating powder to a powder applicator. The invention also relates to a powder coating system and a method for operation of the powder conveying device. For example a manual or automatic powder spray gun can serve as powder applicator or, for short, as applicator.

PRIOR ART

A powder transport device is known from the prior art, EP 1 454 675 A2. The device comprises a powder reservoir with a fluidizing floor and, arranged below it, a connector for compressed air in order to fluidize the powder and generate an overpressure in the powder reservoir. Due to the overpressure, the fluidized powder is transported through a powder conduit, which projects through the lid of the powder reservoir, out of the reservoir and through a supply hose to an applicator. During the cleaning operation, a trigger valve can be used to conduct compressed air into the supply hose at any place between the transport device and the applicator. In this context, the pressure of the compressed air conducted inside is higher than the pressure inside the reservoir. As a result, the powder flow in the supply hose is being stopped and residual powder is removed from the hose. In order to control the amount of powder that flows through the supply hose during the powder conveying operation, the trigger valve can be used to conduct trigger air into the supply hose at a pressure that is lower than the pressure prevailing in the reservoir. As a result, the powder flow is not being interrupted, but rather is being reduced and this takes place dependent on the increase of the total resistance in the support hose.

This solution is disadvantageous in that the maximally possible pressure of the trigger air during the conveying operation must be lower than the pressure prevailing in the powder reservoir. Otherwise, the cleaning operation would be started.

Another disadvantage of this solution is that the pressure of the trigger air affects both the amount of powder and the flow rate of the powder. If the powder flow volume is changed by the trigger air, this necessarily results in a change of the flow rate as well. Accordingly, the powder flow volume can only be adjusted together with the flow rate by means of the trigger air. However, the trigger air cannot be used, or only very inaccurately, to adjust how fast the powder cloud generated by the applicator is to spread. Separate adjustment of the flow rate independent of the amount of powder is not possible.

DESCRIPTION OF THE INVENTION

It is an object of the invention to devise a powder conveying device for the conveying of coating powder to a powder applicator, a powder coating system, and an operating method, in which the disadvantages of the prior art are omitted.

Advantageously, in the powder conveying device according to the invention, the flow rate of the powder flowing through the powder conduit and/or the flow rate of the powder cloud generated by the applicator can be adjusted essentially independent of the conveyed amount of powder. The same applies analogously to the powder coating system and the operating method.

The object is met by a powder conveying device for the conveying of coating powder to a powder applicator having the features of: a working container that is designed and operable appropriately such that pressure can be applied to it, and which comprises a powder inlet and a powder outlet, in which the powder outlet is connected to a powder outlet valve, in which a powder conduit is provided that is connected, on the inlet side, to the powder outlet valve and which comprises, on the inlet side, an inlet for transport air, in which the powder conduit can be connected, on the outlet side, to a powder applicator, and in which a control is provided that is designed and operable appropriately such that it controls the amount of powder to be conveyed by repeatedly opening and closing the powder outlet valve.

The powder conveying device according to the invention for the conveying of coating powder to a powder applicator comprises a working container that is designed and operable appropriately such that it can be pressurized. The working container further comprises a powder inlet and a powder outlet, whereby the powder outlet is connected to a powder outlet valve. In addition, a powder conduit is provided that is connected, on the inlet side, to the powder outlet valve and comprises, on the inlet side, an inlet for transport air. The powder conduit can be connected, on the outlet side, to a powder applicator. Moreover, a control is provided that is designed and operable appropriately such that it controls the amount of powder to be conveyed by repeatedly opening and closing the powder outlet valve.

In addition, the object is met by a powder coating system having the features in which the powder conveying device is connected, on the one hand, to a powder storage container, and, on the other hand, to one or more powder applicators.

The powder coating system according to the invention comprises the powder conveying device described above, whereby the powder conveying device is connected, on the one hand, to a powder storage container and, on the other hand, to one or more powder applicators.

In addition, the object is met by a method for operation of the powder conveying device described above having the features in which the powder conveyance takes place, in that transport air is being conducted into the powder conduit, and in that the control repeatedly opens and closes the outlet valve, whereby the ratio of the period of time, in which the outlet valve is closed, and the period of time, in which the outlet valve is open, is used to adjust the amount of powder to be conveyed.

In the inventive method for operation of the powder conveying device described above, the conveying of powder takes place in that the transport air is conducted into the powder conduit and in that the control repeatedly opens and closes the outlet valve. The amount of powder to be conveyed is adjusted by means of the ratio of the period of time, in which the outlet valve is closed, and the period of time, in which the outlet valve is opened.

Advantageous developments of the invention result from the features specified in the dependent patent claims.

In an embodiment of the powder conveying device according to the invention, the control is designed and operable appropriately such that it triggers the powder outlet valve by means of a pulse width modulation or a pulse frequency modulation for control of the amount of powder to be conveyed.

An additional embodiment of the powder conveying device according to the invention provides a pressure sensor for detection of the pressure in the working container. The control is designed and operable appropriately such that it regulates the pressure in the working container.

A development of the powder conveying device according to the invention provides the inlet for transport air immediately downstream of the powder outlet valve.

In an additional development of the powder conveying device according to the invention, the inlet for the transport air is provided in the form of an annular gap. Allowing the transport air to flow into the powder conduit by means of an annular gap affords multiple advantages. Since the transport air is conducted through the annular gap into the powder conduit such that it has the same direction as the main flow, a negative pressure, rather than a dynamic pressure (no air resistance, no barriers), is generated in the place at which the transport air is conducted inside. As a result, lesser turbulences are generated in the powder conduit. Moreover, the wear and tear on the wall of the powder conduit can be reduced or eliminated altogether.

In another development of the powder conveying device according to the invention, the inlet for transport air is designed appropriately such that the transport air can be blown into the powder conduit at an acute angle.

Moreover, a dosing facility for the transport air can be provided in the powder conveying device according to the invention. For example an air volume regulating valve can serve as dosing facility.

In addition, the powder conveying device according to the invention can be provided to comprise a fluidizing facility. Preferably, the fluidizing facility is arranged in the lower part of the working container.

It is advantageous for the working container of the powder conveying device according to the invention to comprise a further powder outlet and a further powder conduit. The further powder conduit is connected, on the inlet side, to a further powder outlet valve and a further inlet for transport air. On the outlet side, the further powder conduit can be connected to a further powder applicator. As a result, multiple powder applicators can be supplied with powder by the powder conveying device according to the invention. Moreover, the individual powder applicators can be supplied independent of each other and, if needed, each with different amounts of powder.

Moreover, it is advantageous for the working container of the powder conveying device according to the invention to comprise a vent valve. The vent valve is primarily part of a regulating facility by means of which the pressure in the working container can be regulated. The vent valve can also serve as safety valve. In case of malfunction, this can prevent the pressure on the inside of the working container from exceeding a maximally permissible limit.

The powder conveying device according to the invention can comprise an ultrasound sieve that is arranged in the working container.

It is also possible for the powder conveying device according to the invention to comprise an intermediate container that is connected to the powder inlet of the working container by means of a valve. Powder can be aspirated into the intermediate container by means of a vacuum generator. By this means, the working container can be permanently supplied with powder by means of the intermediate container, if needed. In this way, a permanent and interruption-free supply of the powder applicators is made feasible.

The powder conveying device according to the invention can be provided with a controllable compressed air source that is connected to the intermediate container and can be used to pressurize the intermediate container. By this means, the intermediate container can be taken to a pressure level that corresponds to the one of the working container such that there is no pressure difference between the working container and intermediate container. By this means, one cause of pressure variations in the working container can be eliminated. This, in turn, is advantageous in that the pressure variations in the working container and therefore also the pressure variations in the applicator and the variations of the amount of powder conveyed to the applicator can be reduced. The quality of powder application can be optimized further by this means.

In an embodiment of the powder conveying device according to the invention, the intermediate container is arranged above the working container. This is advantageous in that gravity can be used to transport the powder into the working container.

Advantageously, the transport air is conducted into the powder conduit without interruption while the powder is being conveyed in the method for operation of the powder conveying device.

SHORT DESCRIPTION OF THE DRAWINGS

In the following, the invention is illustrated in more detail by multiple exemplary embodiments on the basis of seven figures.

IMPLEMENTATION OPTIONS OF THE INVENTION

Figure 1:
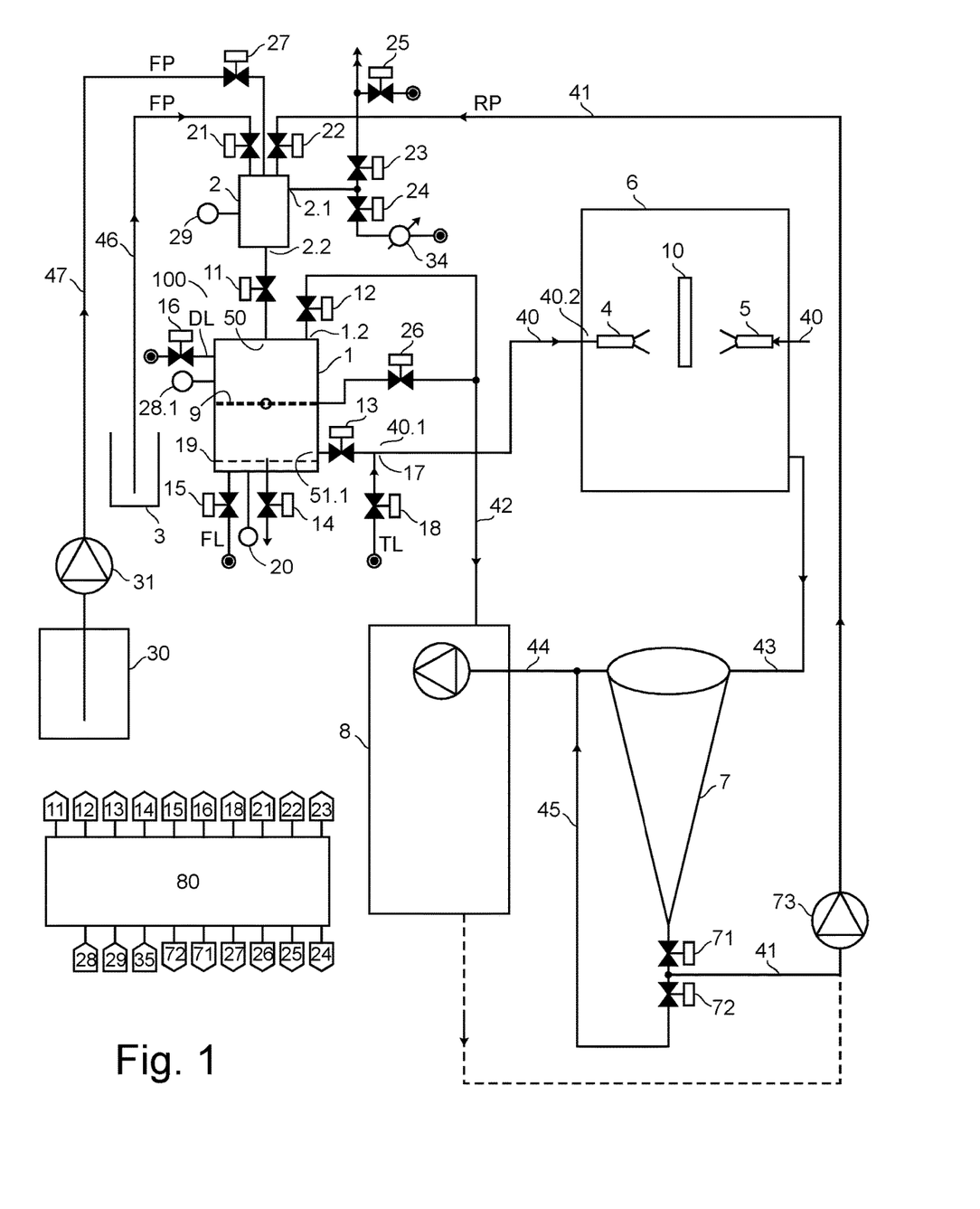
FIG. 1 shows a block diagram of one possible embodiment of a powder coating system with the powder conveying device according to the invention.
Figure 2:
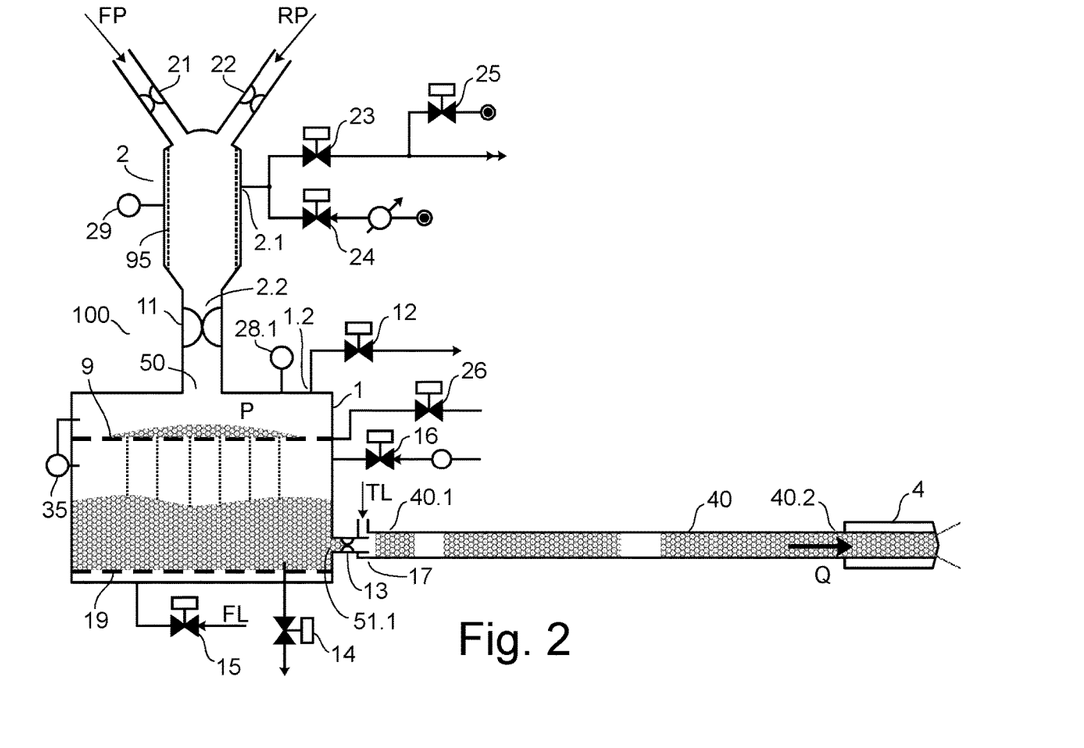
FIG. 2 shows a schematic diagram of one possible embodiment of the powder conveying device according to the invention.

FIG. 1 shows a block diagram of one possible embodiment of a powder coating system with the inventive powder conveying device 100. FIG. 2 shows the schematic-set up of one possible embodiment of the inventive powder conveying device 100. The powder conveying device 100 for the conveying of coating powder to a powder applicator 4 comprises a working container 1. Said container is provided to be pressure-tight such that it can be used while being pressurized. The maximum working pressure in the working container 1 preferably is less than 0.5 bar, as, in this case, the Europäische Druckgeräterichtlinie 97/23/EG or, as it may be, Pressure Equipment Directive 97/23/EC, does not need to applied and, consequently, the technical requirements concerning the design of the working container 1 are lesser.

In one embodiment, the working container 1 comprises a powder inlet 50, which is also referred to as inlet in short, and a powder outlet 51.1, which is also referred to as outlet in short. The powder outlet 51.1 is connected to a powder outlet valve 13. In addition, a powder conduit 40 is provided that is connected, on its inlet-side end-region 40.1, to the powder outlet valve 13.

Hereinafter, the term, inlet-side, shall be used to refer to the inlet-side end-region 40.1 of the powder conduit 40 that is situated on the upstream side of the powder conduit 40.

The powder conduit 40 also comprises, on the inlet side, an inlet 17 for transport air TL in addition to the connector for the outlet of the powder outlet valve 13. In FIG. 1, the powder conduit 40 is connected to a powder applicator 4 on the outlet side. Hereinafter, the term, outlet-side, shall be used to refer to the outlet-side end-region 40.2 of the powder conduit 40 that is situated on the downstream side of the powder conduit 40.

Preferably, the powder outlet 51.1 is situated in the lower area of the working container 1. This is advantageous in that the entire powder can be transported out of the working container 1 without any problems. A fluidizing facility 19 is also situated in the lower area of the working container 1 and can be used to fluidize the powder that is present in the working container 1. The fluidizing facility 19 comprises a separating wall, which is preferred to extend horizontally and is made of a porous material, which can, for example, be a semipermeable material that is permeable to air. The powder present above the porous separating wall is swirled by fluidizing air FL being conducted from below through the porous separating wall, and is put into a floating state. This process is called fluidizing. The fluidized powder present above the fluidizing facility 19 can then be transported out of the working container 1 through the powder outlet 51.1. A valve 15 is provided to be able to control the fluidizing air FL. The valve 15 can be provided, for example, as an air volume regulating valve. Moreover, a shaking device 20, that comprises, for example, a shaking motor, can be installed on the working container 1 in order to support the production of a homogeneous powder-air mixture.

A connector for a further valve 14 can also be provided in the lower area of the working container 1. The valve 14 can be used to remove the residual powder that was not already transported off via the outlet 51.1 from the working container 1.

Moreover, a sieve 9 can be arranged in the working container 1, preferably being provided as an ultrasound sieve. The sieve 9 divides the internal space of the working container 1 into an upper chamber and a lower chamber. The sieve 9 is used to sieve the powder that reached the upper chamber of the working container 1 via the powder inlet 50. Clumps of powder and contaminations are retained in this context. The powder that has been sieved and is ready for being transported off is present in the chamber below the sieve 9. In order to clean the sieve 9, the sieve can be swiveled out of the horizontal line and into a tilted position such that the residual powder and/or the retained material lying on the sieve 9 can slide off the sieve 9.

Figure 7:
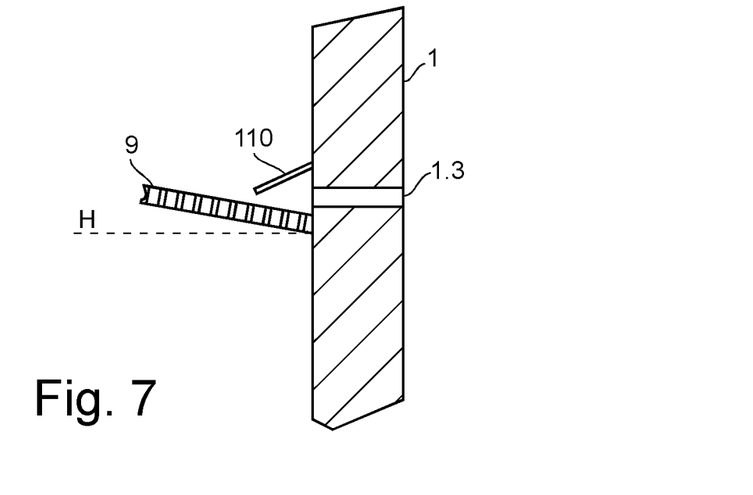
FIG. 7 shows a possible arrangement of a hood for dirt removal in the powder conveying device according to the invention.

Alternatively, the sieve 9 can be permanently arranged to be somewhat tilted, as is shown in FIG. 7. Preferably, the angle is between 1° and 5° and, at best, 3° with respect to the horizontal line H. As a result, the clumps of powder and contaminations accumulate in the lower tilted area of the sieve 9. A hood 110 and a cleaning connector 1.3 in the side wall of the working container 1 below the hood 110 can be provided in this area. The hood 110 can extend slightly tilted. Together with the sieve 9, it forms a slit via which air can get below the hood 110 and is aspirated from there via the cleaning connector 1.3 out of the working container 1. The effect of the air flow is that contaminations resting on the sieve 9 are aspirated from and/or blown out of the working container 1. The cleaning connector 1.3 is connected to the after-filter 8 via the valve 26 and a conduit 42. For cleaning of the sieve 9, the valve 26 is being opened. The working container 1 is still being supplied with compressed air in this context in order to maintain the overpressure in the working container 1. The accumulated soiling is now blown from sieve 9 through the conduit 42 to the after-filter 8 by the overpressure that continues to prevail in the working container 1. There may be a reduced pressure present in the working container 1 during the period of time, in which valve 26 is open. For this reason, the cleaning of the sieve 9 preferably takes place during a coating pause, i.e. in the period of time, in which no powder is being conveyed. Accordingly, the valve 26 and the conduit 42 serve for the removal of soiling.

Moreover, a compressed air connector that is connected to a compressed air source via a valve 16 can be provided on the working container 1. When the valve 16 is open, compressed air DL can flow into the working container 1. This can be used to pressurize the working container 1 and to adjust the desired working pressure in the working container 1. Alternatively, the desired working pressure in the working container 1 can just as well be generated via the supplied fluidizing air FL and via the compressed air DL.

Usually, the fluidizing air FL is sufficient for producing the desired working pressure. However, if, for example, very many powder outlet valves 13 are open, the fluidizing air FL alone may possibly not be sufficient for maintaining the working pressure. In this case, the compressed air DL is used in addition in order to maintain the working pressure and to compensate for pressure variations in the working container 1, if applicable. The compressed air DL can be supplied independent of the fluidizing air FL. In order to obtain a well-fluidized powder-air mixture, it is advantageous to set the fluidizing air FL to a certain value. The compressed air connector for the compressed air DL can be arranged, for example, in the upper area of the working container 1, as indicated in FIG. 1. The compressed air connector can just as well be attached in a place of the working container 1 that allows adhering powder to be blown off the inspection window 92 (FIG. 4) by the compressed air DL. The compressed air DL can also be used to compensate for compressed air losses resulting from minor leakages.

Moreover, the working container 1 can comprise a vent connector 1.2 that is connected to a valve 12 that serves as a vent valve. The vent connector 1.2 can be connected, for example, to an after-filter 8 via the valve 12. Accordingly, the vent connector 1.2 and the valve 12 can also serve to ensure that the pressure in the working container 1 does not exceed a certain maximum pressure. Moreover, the vent connector 1.2 and the valve 12 can be used to keep the working pressure in the working container 1 constant.

A possible method for venting shall be described in the following. If a certain maximum pressure Pmax is exceeded, a control 80 make sure that the vent valve 12 opens for a certain short period of time T1 (open time) and closes for a period T2 (closed time). The pressure in the working container 1 is measured by a pressure sensor 28.1 and, if the pressure is determined to still be excessive, the valve 12 is opened briefly again. In this context, it can be provided that the open time T1 and the closed time T2 are now selected to be somewhat longer. This process is repeated until the pressure in the working container 1 is below the maximum pressure Pmax again. Upon each repetition, the open time T1 and the closed time T2 can be selected somewhat longer, and this can be done until the open time T1 and the closed time T2 have reached a certain value Tsoll=T1+T2. If further repetitions were to take place afterwards, the open time T1 and the closed time T2 would not be made longer any more, but would be maintained. The Tsoll value can, for example, be 300 ms.

This allows the pressure drop in the working container 1 to be kept small. Moreover, the reaction time is short. If the pressure in the working container 1 is below the maximum pressure Pmax, the vent valve 12 stays closed. Moreover, the wear and tear on the vent valve 12 can be reduced, since the valve is not actuated more often than necessary.

An alternative method for venting could be as follows. The control 80 controls the vent valve 12 by means of a pulse-coded control signal. The pulse-coded control signal can be, for example, pulse width- or pulse frequency-modulated. The duty factor of the pulse-coded control signal corresponds to the period of time T for which the vent valve 12 is to be open.

If the powder conveying device 100 serves for supplying many powder applicators 4, it is possible that the working container 1 is supplied with a large amount of compressed air for maintenance of the working pressure. If, now, a significant part or all powder applicators are switched off simultaneously and the supply of fluidizing air FL is not interrupted, it is possible that a single vent valve 12 is insufficient in order to enable a sufficient pressure compensation. It can also be advantageous to provide multiple vent valves 12. These can have the same design as the vent valve 12 and can be connected in the same way as the vent valve 12.

Preferably, the powder outlet 50 is situated in the upper area of the working container 1. It can be arranged, for example, in the lid of the working container 1. The powder inlet 50 is connected to the powder outlet 2.2 of an intermediate container 2 via a powder valve 11, which is provided, for example as a pinch valve. The intermediate container 2 is usually arranged above the working container 1. By this means, gravity can been used to transport powder that is present in the intermediate container 2 downwards into the working container 1.

In an embodiment of the working container 1, the powder inlet 50 is situated in the middle of the lid of the working container 1, as is indicated in FIG. 2. This is advantageous in that the powder also falls onto the middle of the sieve 9 such that it is better distributed over the entire sieve 9. Alternatively, the powder inlet 50 can just as well be situated on the side of the working container 1, above the sieve 9.

The intermediate container 2 can just as well be arranged adjacent to the working container 1 such that the powder outlet 2.2 of the intermediate container 2 and the powder inlet 50 of the working container 1 are still situated above the sieve 9. As before, gravity can been used to transport powder that is present in the intermediate container 2 downwards into the working container 1.

In the embodiment shown in FIG. 1, the intermediate container 2 comprises, on the inlet side, a powder inlet and a powder inlet valve 21 by means of which the fresh powder FP can be aspirated or pumped into the intermediate container 2. Moreover, the intermediate container 2 comprises, on the inlet side, a further powder inlet and a powder inlet valve 22 by means of which the recycled powder RP can be aspirated into the intermediate container 2. The two powder inlet valves 21 and 22 can be provided as pinch valves. However, it is also feasible to provide on the intermediate container 2 only one powder inlet and one powder inlet valve by means of which then either fresh powder FP or recycled powder RP can be aspirated or pumped.

The intermediate container 2 can be supplied, for example, via a powder storage container 2 and a powder conduit 46. Alternatively, the intermediate container 2 can just as well be provided with fresh powder FP via a powder storage container 30, a powder pump 31, and a powder conduit 47.

The powder storage container 30 is often a so-called big bag, which is also referred to as a flexible intermediate bulk container or FIBC for short. The powder storage container 30 usually contains larger amounts of powder than the powder storage container 3. In addition, the powder storage container 30 is usually positioned farther away from the intermediate container 2 than the powder storage container 3. Accordingly, the powder storage container 30 can be positioned at a distance of, for example, 30 m from the intermediate container 2, whereas the powder storage container 3 is position, for example, 5 m from the intermediate container 2.

In the powder storage container 3, the negative pressure prevailing in the intermediate container 2 conveys the powder into the intermediate container 2. Therefore, no further powder conveying device is required and this is therefore inexpensive.

If, for example, a big bag is used as the powder storage container 30, it is common that larger amounts of powder are being conveyed. To this end, it is of advantage to use an additional powder conveying device, such as, for example, the powder pump 31. Here, the prevailing negative pressure helps removing the air from the intermediate container 2. The excess air in the intermediate container 2 can be discharged using the opening 2.1. As a result, no dynamic pressure is produced in the intermediate container 2.

It can be of advantage to have multiple intermediate containers to be present by means of which powder is supplied to the working container 1. The intermediate containers 2 can be installed above the working container 1.

If two intermediate containers 2 are used, these can be operated, for example, in a phase-shifted manner; while one of them aspirates powder, i.e. works in the aspiration phase, the other one working in the outlet phase transports the powder into the working container 1. The working container 1 is continuously being filled with powder by this means. This allows large amounts of powder to be conveyed into the working container 1.

The intermediate container 2 comprises a connector 2.1 by means of which the intermediate container 2 can be pressurized with compressed air. For this purpose, the connector 2.1 can be connected to a compressed air source by a valve 24. The valve and the compressed air source form a controllable compressed air source. A pressure regulating valve 34, which can be arranged between the compressed air source and the valve 24, can be part of the controllable compressed air source.

The same connector 2.1 can also be used to discharge the compressed air from the intermediate container 2. For this purpose, the connector 2.1 can be connected to the surroundings by means of a valve 23. The connector 2.1 can also be used to aspirate the compressed air from the intermediate container 2 and to generate a negative pressure. For this purpose, an additional vacuum valve 25 is provided that generates a negative pressure on the connector 2.1 when the valve 23 is open. The vacuum valve 25 serves as a vacuum generator.

On principle, the compressed air sources shown in the block diagram according to FIG. 1 can be regulated compressed air sources that generate a constant pressure or a constant amount of air.

All valves 11 to 16, 18, and 21 to 26 can be controlled by means of a control unit 80, which shall be referred to as control hereinafter. If needed, the control 80 can also be used to trigger the valves 71 and 72. The control unit 80 can be used both for controlling and for regulating.

The operating principle of the intermediate container 2 is illustrated in more detail in the following. The intermediate container 2 is assumed to be free of powder initially. The valves 11, 21, 22, 24, and 27 are being closed in a first step such that neither can powder get into the intermediate container 2, nor can powder be transported out of the intermediate container 2. Then, valve 23 and the vacuum valve 25 are being opened in order to generate a negative pressure in the intermediate container 2. As soon as the valve 21 and/or 27 is opened for fresh powder FP or the valve 22 is opened for recycled powder RP, powder is being aspirated into the intermediate container 2. There is no need to wait for a negative pressure to be established in the intermediate container 2, but rather the powder inlet valve 21, 22 and/or 27 can already be opened before this takes place. Once enough powder has accumulated in the intermediate container 2, the valve 21 and/or 27 for fresh powder FP and/or the valve 22 for recycled powder RP are being closed again. For this purpose, the valve 21, 22 and/or 27 can be open for a certain period of time, for example for 6 seconds. Subsequently, the outlet valve 11 is being opened such that the powder can get out of the intermediate container 2. This can take place by utilizing gravity. In order to support the powder transport out of the intermediate container 2, compressed air can be blown into the intermediate container 2 via connector 2.1. Valve 24 is being opened for this purpose. Since the working container 1 is permanently pressurized during the conveying operation, it is of advantage for the pressure in the intermediate container 2 to be larger than or at least equal to the pressure in the working container 1. A pressure regulating valve 34 can be used for regulation of the pressure. As soon as the powder exited from the intermediate container 2, the valves 11 and 24 are being closed again. Subsequently, the intermediate container 2 can be filled with powder again using the procedure described above.

The pressure in the intermediate container 2 can just as well be measured directly on the intermediate container 2. As a result, the actual pressure actually prevailing in the intermediate container 2 is detected. An appropriate pressure regulation, which can, for example, be implemented in the control 80, can be used to ensure that the actual pressure in the intermediate container 2 does in fact correspond to the desired target pressure. If the pressure in the intermediate container 2 is equal to the pressure in the working container 1, there is no pressure drop in the working container 1 when the valve 11 is being opened. This ensures homogeneous powder conveyance to the powder applicator 4 and/or to the powder applicators even in the period of time, in which powder is being filled into the working container 1.

The operating principle of the working container 1 is illustrated in more detail in the following. As soon as the powder valve 11 is opened, the powder exits from the intermediate container 2 and into the working container 1. The powder drops onto the sieve 9, where it is sieved, and then trickles from there onto the fluidizing unit 19. In order to transport the powder out of the working container 1 to the powder applicator 4, the valve 18 is being opened such that transport air TL flows into the powder conduit 40. In this context, it is of advantage for the valve 18 to be permanently open such that the transport air TL can continuously flow into the powder conduit 40. As soon as the powder outlet valve 13 is being opened, the negative pressure prevailing in the working container 1 causes the powder to be conveyed out of the working container 1 and via the powder conduit 40 to the powder applicator 4. This state is also referred to as powder outlet phase A on the working container 1. The valve 14 is closed while the powder is being conveyed out of the working container 1. However, if there is a malfunction in the working container 1 during the outlet phase A, for example if the pressure in the working container 1 exceeds a certain level, the valve 12 and/or the valves 11 and 22 can be opened.

In order to set the powder amount Q to be conveyed per unit time, the invention provides for closing the powder outlet valve 13 temporarily, or for opening it for a certain period of time. The control 80 can determine the period of time for which the outlet valve 13 stays open and/or closed.

For this purpose, the control 80 can apply, for example, a control signal S in the form of a pulse on the control input of the outlet valve 13. The control signal S can be an electrical signal or a compressed air signal. In an explosion hazard environment, it may be of advantage to use a compressed air signal as control signal S.

The control 80 can generate, for example, a pulse width-modulated control signal S that alternates between two values (Open or Closed and/or 0 or 1). In this context, keeping the frequency F=1/TPWM constant, the duty factor Tein/TPWM of the control pulse is being modulated. In this context, TPWM is the period of the control signal S and Tein is the width of the control pulse. The duty factor and/or the pulse width Tein can be used to adjust the amount of powder Q to be conveyed during unit time. Here, the smaller the duty factor, the lower is the amount of powder Q to be conveyed per unit time. If the duty factor Tein/TPWM=0, no powder is being conveyed. The maximum amount of powder Q to be conveyed is reached at a duty factor of Tein/TPWM=1.

Figure 3A:
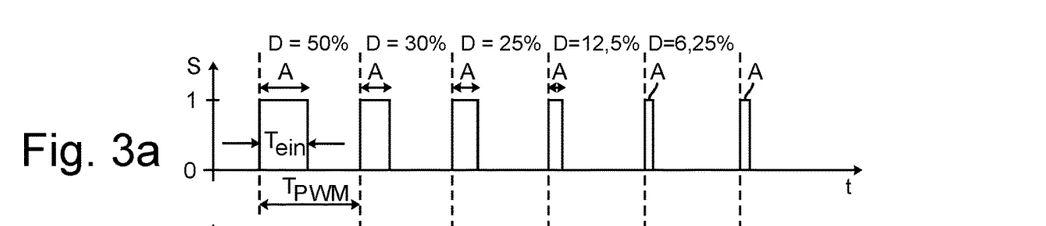
FIG. 3*a* is a diagram showing the time course of the control signal for the powder outlet valve.
Figures 3B, 3C:
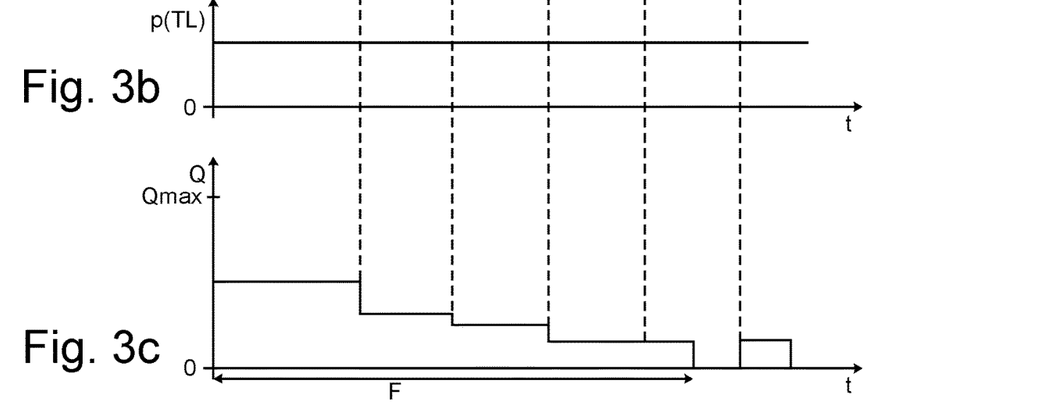
FIG. 3*b* is a diagram showing the time course of the supplied transport air pressure.
FIG. 3*c* is a diagram showing the amount of powder conveyed per time.

FIG. 3a shows a pulse width-modulated control signal S plotted over time t in exemplary manner. Here, S=1 corresponds to the "Open" valve position of the outlet valve 13. Accordingly, the outlet valve 13 is open for a period of time Tein such that powder can flow through the outlet valve 13 for the period of time Tein. FIG. 3b shows the time course of the air pressure p(TL) of the transport air TL. In the present example, p(TL) is constant. And lastly, FIG. 3c shows an exemplary diagram of the amount of powder Q conveyed per unit time on the outlet 40.2 of the powder conduit 40. It is evident that powder is being conveyed despite the outlet valve 13 being closed for periods of time. The reason for this being that the periods of time, in which the outlet valve 13 is closed, are short enough and that the transport air TL in the powder conduit 40 mixes with the powder in the course of time. It can no longer be detected on the outlet 40.2 that the powder flow in the inlet area 40.1 of the powder conduit 40 was repeatedly interrupted by the outlet valve 13. A homogeneous powder-air mixture is made available on the outlet 40.2 of the powder conduit 40.

In a preferred and tested embodiment, the amount of powder to be conveyed can be adjusted to be between 30 and 2,000 g/min. However, the powder conveying device 100 can just as well be adapted appropriately such that amounts of powder ranging from 10 to 5,000 g/min can be conveyed. In a tested embodiment, the powder was conveyed over a distance between 5 to 30 m. However, the powder conveying device 100 can just as well be adapted appropriately such that powder can be conveyed over distances from 1 m to 50 m.

Powder conduits 40 with an internal diameter from 3 to 30 mm can be used for this purpose. Various hoses with internal diameters between 8 and 12 mm have been used in the tested embodiment. However, standard hoses with an internal diameter from 6 to 14 mm can be used just as well.

The internal diameter of the powder conduit 40 is selected based on the amount of powder to be conveyed. For smaller amounts of powder, a powder conduit with a smaller internal diameter is usually sufficient. The transport air TL can be set in a range of 0.1 to 50 Nm3/h (standard cubic meter per hour) or 0.5 to 6 Nm3/h, the transport air TL can be set in a pressure range from 0.1 to 10 bar. The internal diameter of the pinch valve preferably is in the range of 3 to 10 mm, even better between 3 and 5 mm. Preferably, the total cycle time is in the range of 100 to 300 ms. Preferably, the pulse width can be adjusted in a range of 5 to 90 or 290 ms.

The pressure p(TL) of the transport air TL can be used to set the flow rate of the powder flow. The higher the transparent air pressure p(TL), the faster the powder flows through the powder conduit 40 and the faster the powder cloud generated by the powder applicator 4 spreads. A fast powder cloud is of advantage if it is to penetrate far into the workpiece. This is helpful, for example, for a work piece with a large depression. However, if the workpiece is relatively flat, a soft and therefore slow powder cloud is more likely to be used. Accordingly, the flow rate of the powder can be used to ideally adapt the powder cloud to the geometry of the workpiece to be coated. Moreover, the flow rate can be adapted to the type of powder that is being used (grain size, adhesion, etc.). Taken together, this leads to optimized coating efficiency. It can be made sure that the powder can be conveyed in a homogeneous, i.e. in a reliable process, reproducible, and low-wear manner for an extended period of time. Organic types of powder and inorganic types of powder, such as, for example, enamel, can be conveyed.

Instead of a pulse width-modulated control signal S, it is feasible to use a pulse frequency- or pulse density-modulated control signal S. Referring to a pulse frequency-modulated control signal S, the pulse width Tein of the individual pulses is constant over time. The lower the pulse density, the lower is the amount of powder Q conveyed per unit time. If the pulse density equals 1, the maximum amount of powder Q to be conveyed is reached.

In principle, other pulse-coded control signals S can be used just as well in order to adjust the amount of powder Q to be conveyed. In this context, the term "pulse-coded" shall be understood to mean the implementation of any numerical value into a binary pulse sequence.

Figure 4:
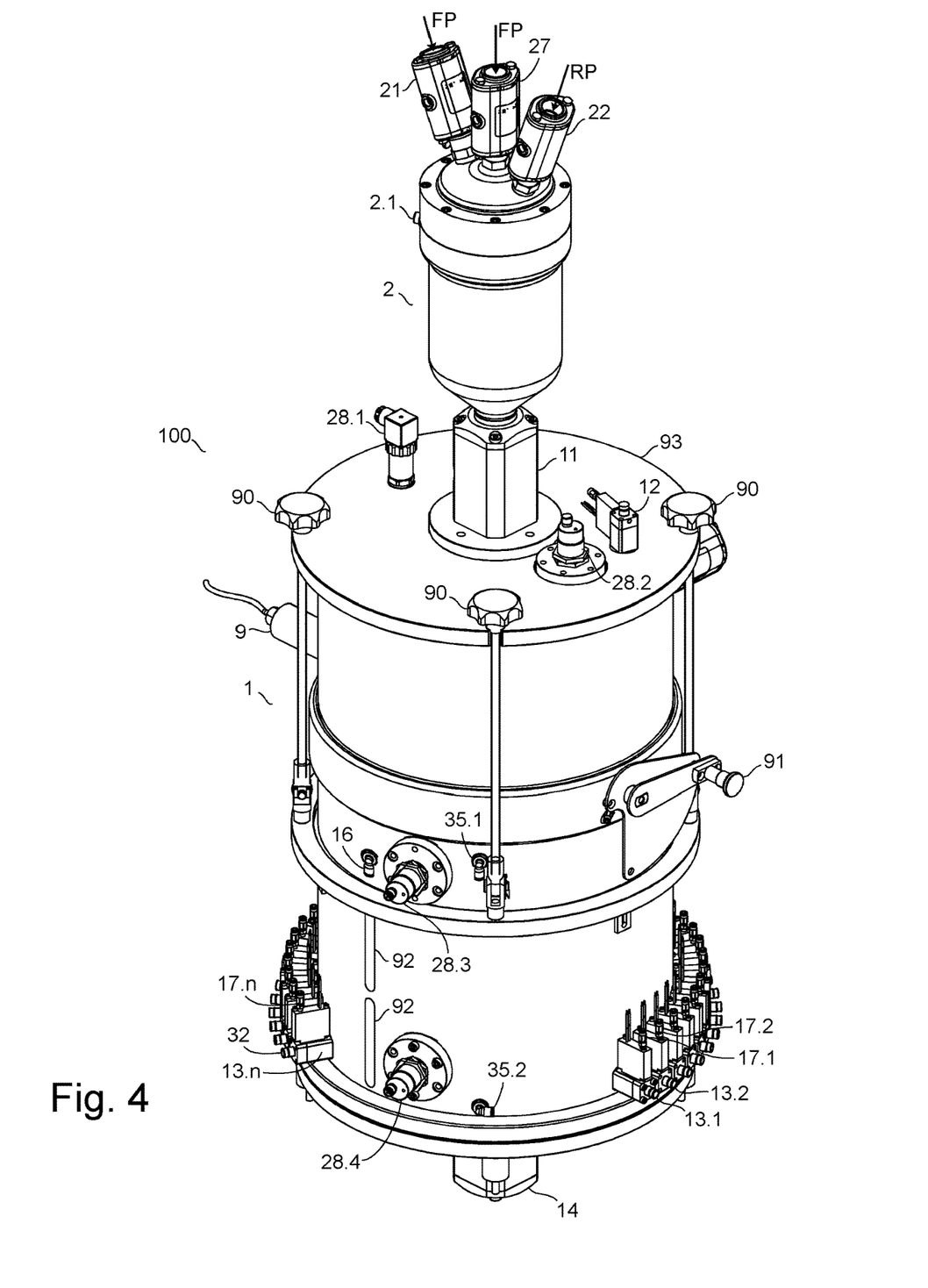
FIG. 4 shows a three-dimensional view of a possible embodiment of the powder conveying device according to the invention.
Figure 5:
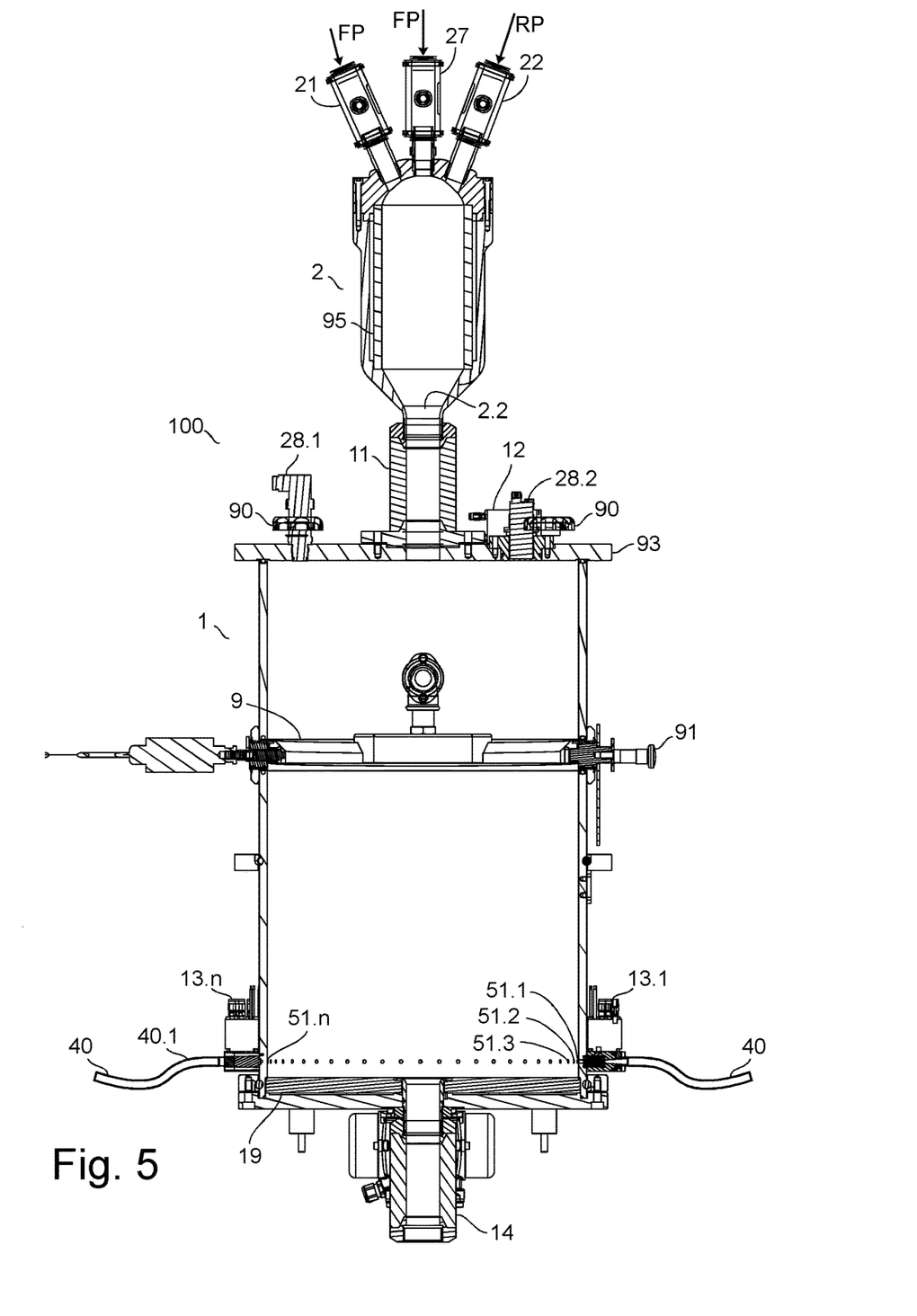
FIG. 5 shows a longitudinal section of the powder conveying device according to the invention.

FIG. 4 shows a three-dimensional view of further possible embodiment of the powder conveying device 100 according to the invention. FIG. 5 shows a longitudinal section of the further embodiment of the powder conveying device 100 according to the invention. In this embodiment, the working container 1 comprises n powder outlets 51.1-51.n, whereby each of the powder outlets 51.1-51.n is connected to one powder outlet valve 13.1 to 13.n each. One powder conduit 40 and one powder applicator each can be connected to each of the powder outlet valves 13.1 to 13.n. The control 80 can be designed appropriately such that it can be used to separately trigger each of the powder outlet valves 13.1 to 13.n. This achieves a high degree of flexibility. Accordingly, for example, the applicator connected to the powder outlet valve 13.1 can be switched off by keeping the powder outlet valve 13.1 permanently closed, whereas the applicator connected to the powder outlet valve 13.2 is being switched on by appropriately triggering the powder outlet valve 13.2. Moreover, it is possible to supply different amounts of powder to the individual applicators by appropriately triggering the respective outlet valves 13.1 to 13-n differently. In addition, the individual applicators can also generate powder clouds with different velocities by the valves 18 for the transport air TL being set correspondingly to different transport air volumes. It is also feasible to use powder conduits 40 that differ in length, whereby the length differences between the powder conduits can be compensated for by a corresponding individual triggering of the outlet valves 13.

To be able to clean the sieve 9, the sieve can be tilted from the horizontal working position (see FIG. 5) and into a tilted position (not shown in the Figures). A tilting mechanism 91 is provided on the working container 1 for this purpose. A closure 90 is provided to be able to open the lid of the working container 1. Same can be provided, for example, in the form of a screw mechanism or a clamping mechanism. One or more inspection windows 92 can be arranged in the lower area of the working container 1. The invention can provide another inspection window and a light source in the working container 1, on the opposite side of the inspection window 92. This makes it possible to visually detect the powder level in the working container 1 during its operation without having to open the working container 1. The visual detection can take place by means of sensors or by the operating personnel.

One embodiment has a capacitive sensor 28.2 arranged on the working container 1 in the area of the upper chamber. The sensor 28.2 can be arranged, for example, on the lid 93 of the working container 1. Using the sensor, the filling level in the upper chamber of the working container 1 can be detected, transmitted to the control 80, and analyzed therein. By this means, the control 80 can determine if a sufficient amount of powder trickles through the sieve 9 or if the sieve 9 is clogged. If applicable, the control 80 can respond accordingly, for example with a warning notice to the operating personnel.

In a further embodiment, another capacitive sensor 28.3 is arranged below the sieve. Using the sensor, the filling level in the upper chamber of the working container 1 can be detected and transmitted to the control 80. The control 80 can analyze the sensor signal and is thus capable of determining whether too much powder or too little powder is present in the upper chamber, and it can respond accordingly, for example by issuing a warning notice to the operating personnel.

In a further embodiment, a capacitive sensor 28.4 is arranged on the working container 1 in the area of the lower chamber.

However, other sensors can be used just as well in place of the capacitive sensors 28.3 and 28.4 as long as they are suitable for measuring the filling level.

In a further embodiment, a connector 35.1 is provided in the area from the sensor 28.3 to the lid 93 of the working container 1, i.e. in the non-fluidized area. A connector 35.2 is provided between the floor of the working container 1 and the sensor 28.4 such that the connector 35.2 is always situated in the fluidized area. A differential pressure sensor 35 for detection of the difference between the pressure in the upper and the pressure in the lower chamber can be connected to the two connectors 35.1 and 35.2. The differential pressure signal generated by the differential pressure sensor 35 can be transmitted to the control 80. The control 80 can use the differential pressure to determine the exact filling level.

The filling level in the lower chamber of the working container 1 can be calibrated with the aid of the two capacitive sensors 28.3 and 28.4. The powder injection amounts can be determined for each powder outlet valve 13.1 to 13.$n$ using multiple reference measurements with different settings. By this means, filling level measurements can also be performed during operation. For this purpose, powder is prevented from proceeding from the intermediate container 2 into the working container 1 for a certain period of time. Then, the total amount of powder conveyed in a certain period of time by the powder outlet valves 13.1 to 13.$x$ that were used in this context is determined. Subsequently, the control 80 checks if the total amount of powder is within a certain range. If this is not the case, the control 80 can issue a notice. In this regard, reference shall be made to the method for the determination of an amount of powder or a change of an amount of powder in a container known from EP 1092958 B1. The content thereof shall herewith be included in this application.

FIG. 5 shows a longitudinal section of a possible embodiment of the intermediate container 2. On the inside of the intermediate container 2, there is a semipermeable wall 95 that is permeable to air, but impermeable to powder. The connector 2.1 and the valve 24 connected to it can be used, as described above, to aspirate air out of the intermediate container 2 and to generate a negative pressure. Providing the semipermeable wall 95 makes sure that the powder aspirated into the intermediate container 2 cannot be aspirated off via the connector 2.1. If compressed air is pressed through the valve 24 and the connector 2.1 into the intermediate container 2, the air can flow through the semipermeable wall 95 and generate an overpressure in the intermediate container 2. If the valve 11 is open, the compressed air can also be used to remove from the wall 95 any powder deposited thereon.

Figure 6:
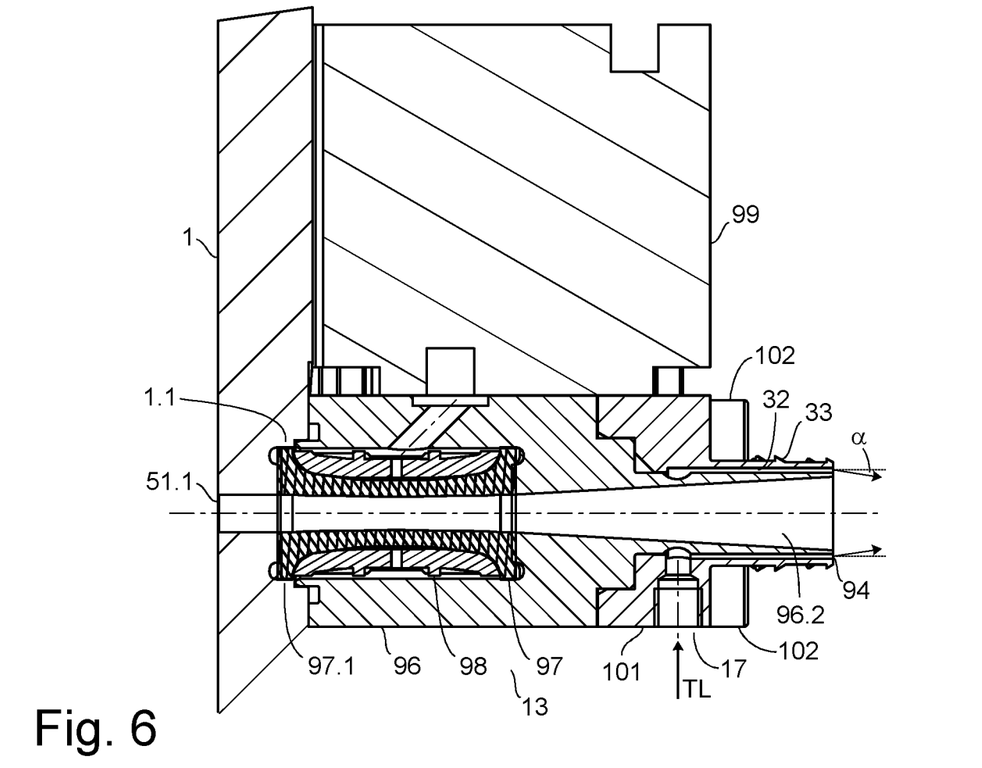
FIG. 6 shows a sectional view of a possible embodiment of an outlet valve.

FIG. 6 shows a sectional view of a possible embodiment of the powder outlet valve 13. The outlet valve 13 comprises a valve body 96 and an inlet body 101, which both can be secured to the working container 1 by means of screws 102. In the embodiment shown in FIG. 6, the valve body 96 is inserted into a suitably provided holder 1.1 on the working container 1. To keep the channel in the working container 1 for the powder outlet 51.1 as short as possible, the holder 1.1 is lowered into the working container 1 and is provided in the form of a blind hole, as shown in FIG. 6. However, this does not necessarily have to be the case. The upstream end-section 97.1 of the pinch valve 97 can also be placed in the holder 1.1. This is advantageous in that the pinch valve 97 is thus made to be positioned correctly. However, this also does not necessarily have to be the case.

The valve 13 also comprises a valve control connector-block 99, which can be provided, for example, as an electro-pneumatic quick-acting valve. Preferably, same has a short switching time and a short response time. The valve control connector block 99 is connected to the corresponding control output of the control 80 via an electrical control cable that is not shown here. The control 80 can therefore use the control signal S to cause the valve 13 to be opened or closed. A hose pinch valve 97, whose passage is either open or closed—depending on the compressed air control signal S—is situated on the inside of the valve body 96. In the compressed air-free state, the hose pinch valve 97 is relaxed and its passage is open. The outside of the hose pinch valve 97 then touches against the inside of the ring 98. Providing the ring 98 makes sure that the opening width of the hose pinch valve 97 in the compressed air-free state stays the same and is defined—regardless of the pressure prevailing in the working container 1. This provides for a reproducible opening width of the valve 13. The ring 98 can be made, for example, from plastics. This set-up is advantageous in that the pressure in the working container 1 helps open the hose pinch valve 97. In a powder conveyor that needs to open the pinch valve even in the presence of a negative pressure, this may eventually lead to problems. For control of the valve 13, a control valve arranged in the control connector block 99 is provided. Advantageously, a so-called normally open valve is used as control valve in the control connector block 99. Upon failure of the control 80, i.e. if no control signal S is applied to the control valve, the normally open valve is open such that the pinch valve 97 of the valve 13 is closed.

It is of advantage to have the inlet 17 be situated immediately adjacent to the valve 13, since the supply transport air TL can then mix with the conveyed powder essentially over the entire length of the powder conduit 40. However, said arrangement is not necessarily required. The inlet 17 can just as well be situated a little further downstream on the powder conduit 40.

It is also advantageous to have the transport air TL flow into the powder conduit 40 in annular fashion at a flat angle α. This is feasible with the embodiment shown in FIG. 6. The inlet body 101 with the inlet 17 for the transport air TL comprises an axially-extending air channel 32 that surrounds the downstream end-region of the powder channel 96.2 of the valve body 96 in annular fashion. The outside of the downstream end-region of the inlet body 101 can just as well be provided in the form of a hose nipple 33. The powder conduit 40 or the powder hose can be pushed onto the hose nipple 33 and secured. A hose coupling, for example with a snap coupling, is also conceivable in this context (not shown in the Figures). The inside of the hose nipple 33 and the outside of the powder channel 96.2 form an annular transport air channel 32. The downstream end of the hose nipple 33 and of the powder channel 96.2 form an annular gap 94 that serves as downstream opening of the transport air channel 32. A cross hole is provided in the inlet body 101 for supply of the transport air channel 32. The transport air TL flows through the transport air channel 32 to its downstream end and from there in annular fashion and at a flat angle α into the powder conduit 40.

Allowing the transport air TL to flow into the powder conduit 40 by means of the annular gap 94 affords multiple advantages. Since the transport air TL is conducted through the annular gap 94 into the powder conduit 40 such that it has the same direction as the main flow, a negative pressure, rather than a dynamic pressure (no air resistance, no barriers), is generated at the inlet 17. As a result, lesser turbulences are generated in the powder conduit 40. Moreover, the wear and tear on the wall of the powder conduit 40 can be reduced or eliminated altogether.

Other embodiments of the inlet body 101 are feasible just as well. For example, the inlet body 101 can comprise one or more channels by means of which the transport air TL is conducted into the powder conduit 40 at an angle between 0 and 89°. The transport air TL flowing through the channels tends to generate a negative pressure in the powder conduit 40.

It is also feasible to provide the inlet body 101 appropriately such that the transport air TL flows into the powder conduit 40 at an angle of 90° or more.

The inlet body 101 can just as well be provided appropriately such that the transport air TL flows into the powder conduit 40 via a filter tube made of microporous material.

The invention can just as well provide for the valve 18 for the transport air TL to be closed briefly during the outlet phase A such that no transport air TL is conducted into the powder conduit 40 short period of time. This reduces the influence of the transport air TL on the conveyed amount of powder Q even more.

In case of need, the powder channel 96.2 of the valve body 96 on the downstream side of the valve 13 can be conical in shape.

The powder conduit 40 can be provided as a hose either fully or in part.

As shown in FIG. 1, the powder coating system can also comprise a cyclone 7 for recovery of the powder and an after-filter 8 in addition to the powder conveying device 100 and the coating booth 6.

In order to remove the overspray from the coating booth 6, the overspray is aspirated from the booth together with the air present in the coating booth 6 in the form of a powder-air mixture, which is conducted to the cyclone 7 that can be provided in the form of a mono-cyclone. The powder-air mixture flows tangentially on the top into the cycle 7 and spirally downward in the cyclone. The centrifugal force generated during the rotation of the powder-air flow pushes the powder particles outward against the outside wall of the cyclone. Subsequently, the powder particles are conveyed downward in the direction of the powder outlet of the cyclone and are collected there. The air freed of the powder particles is aspirated via a central tube that is situated in the cyclone. In addition, the thus cleaned air flow can be conducted to the after-filter 8 in order to remove, by filtration, even the powder still remaining in the air. If the valve 71 is open, the recycled powder RP can be removed from the cyclone 7 and can be supplied to the powder conveying device 100 again by means of a pump 73 and a conduit 41. If the valve 72 is open, the filtered powder in the cyclone can just as well be supplied to the after-filter 8 by means of the conduits 45 and 44.

The after-filter 8 can be fitted with filter cartridges that remove, by filtration, the remaining powder particles present in the air. A preferably electrically-driven ventilator or fan provides for the requisite air through-put.

If no cyclone 7 is used, the powder also can be removed from the after-filter 8 and can be supplied to the powder conveying device 100 again by means of the pump 73 and the conduit 41.

The description above of the exemplary embodiments according to the present invention serves for illustrative purposes only. Various changes and modifications are feasible within the scope of the invention. Accordingly, for example, the different components of the conveying device shown in FIGS. 1 to 6 can just as well be combined with each other in a way different from the one shown in the Figures.

LIST OF REFERENCE NUMBERS

1 Working container
1.1 Holder
1.2 Vent connector
1.3 Cleaning connector
2 Intermediate container
2.1 Connector on the intermediate container
2.2 Powder outlet of the intermediate container
3 Storage container
4 Applicator
5 Applicator
6 Coating booth
7 Cyclone separator
8 After-filter
9 Ultrasound sieve
10 Workpiece
11 Valve
12 Vent valve
13 Outlet valve
13.1-13.*n* Outlet valves
14 Valve
15 Valve
16 Valve
17 Inlet for transport air
17.1-17.*n* Inlets for transport air
18 Dosing facility for the transport air
19 Fluidizing facility
20 Shaking device
21 Valve for fresh powder
22 Valve
23 Valve
24 Valve
25 Vacuum valve or vacuum generator
26 Valve
27 Valve for fresh powder
28 Sensor
28.1 Pressure sensor
28.2 Sensor
28.3 Sensor
28.4 Sensor
29 Sensor
30 Storage container
31 Pump
32 Transport air channel
33 Hose nipple
34 Pressure regulating valve
35 Differential pressure sensor
35.1 Connector for differential pressure sensor
35.2 Connector for differential pressure sensor
40 Powder conduit
40.1 First end of the powder conduit
40.2 Second end of the powder conduit
41 Conduit
42 Conduit
43 Conduit
44 Conduit
45 Conduit
46 Conduit
47 Conduit
50 Powder inlet
51.1-51.*n* Powder outlets
71 Valve
72 Valve
73 Pump
80 Control
90 Closure
91 Tilting mechanism
92 Inspection window
93 Lid of the working container
94 Annular gap 95 Semipermeable wall
96 Valve body
96.2 Powder channel
97 Hose pinch valve
97.1 End-section of the hose pinch valve
98 Ring
99 Valve control connector block
100 Powder conveying device
101 Inlet body
102 Screw
A Outlet phase
FL Fluidizing air
F Conveying phase
FP Fresh powder
H Horizontal line
Q Amount of powder per unit time
RP Recycled powder
S Control signal
TL Transport air
T Time
T Period of time
α Angle

The invention claimed is:

1. A powder conveying device for the conveying of coating powder to a powder applicator comprising
a working container that is designed and operable to withstand pressure, and which comprises a powder inlet and a powder outlet,
in which the powder outlet is connected to a powder outlet valve,
in which a powder conduit is provided that is connected, on an inlet side of the powder conduit, to the powder outlet valve and which the powder conduit comprises, on the inlet side, an inlet for transport air,
in which the powder conduit is connectable, on an outlet side of the powder conduit, to a powder applicator,
in which a control is provided that is designed and operable such that the control controls the amount of powder to be conveyed by repeatedly opening and closing the powder outlet valve,
in which a pressure sensor for detection of the pressure in the working container is provided, and
in which the control is designed and operable such that the control regulates the pressure in the working container.

2. The powder conveying device according to claim 1, in which the control is designed and operable such that the control triggers the powder outlet valve by means of a pulse width modulation or a pulse frequency modulation for control of the amount of powder to be conveyed.

3. The powder conveying device according to claim 1, in which the inlet for transport air is provided immediately downstream of the powder outlet valve.

4. The powder conveying device according to claim 1, in which the inlet for transport air is provided in the form of an annular gap.

5. The powder conveying device according to claim 1, in which the inlet for transport air is designed such that the transport air is blowable into the powder conduit at an acute angle.

6. The powder conveying device according to claim 1, in which a dosing facility for the transport air is provided.

7. The powder conveying device according to claim 1, in which a fluidizing facility is provided in the working container.

8. The powder conveying device according to claim 1,
in which the working container comprises a further powder outlet and
in which a further powder conduit is provided, which is connected, on the inlet side, to a further powder outlet valve and to a further inlet for transport air, and which is connectable, on the outlet side, to a further powder applicator.

9. The powder conveying device according to claim 1,
in which the working container comprises a vent valve, and
in which the control is designed and operable such that the control opens, once a certain pressure in the working container is exceeded, the vent valve for a certain period of time by triggering the vent valve by means of a pulse-coded control signal.

10. The powder conveying device according to claim 1, in which an ultrasound sieve arranged in the working container is provided.

11. The powder conveying device according to claim 1,
in which an intermediate container having a powder inlet and a powder outlet is provided,
in which the powder outlet of the intermediate container is connected, via a valve, to the powder inlet of the working container, and
in which a vacuum generator is provided by means of which powder is aspirateable via the powder inlet into the intermediate container.

12. The powder conveying device according to claim 11, in which is provided a controllable compressed air source that is connected to the intermediate container and is useable to pressurize the intermediate container.

13. The powder conveying device according to claim 1, in which the intermediate container is arranged above the working container.

14. A powder coating system with the powder conveying device according to claim 1,
in which the powder conveying device is connected to a powder storage container and to one or more powder applicators.

15. A method for operation of the powder conveying device according to claim 1, comprising:
conveying powder,
conducting transport air into the powder conduit, and
operating the control to repeatedly open and close the outlet valve, whereby the ratio of the period of time, in which the outlet valve is closed, and the period of time, in which the outlet valve is open, is used to adjust the amount of powder to be conveyed.

16. The method according to claim 15,
in which the transport air is transported into the powder conduit without interruption while the powder is being conveyed.

* * * * *